United States Patent [19]

Kieffer

[11] 4,216,887
[45] Aug. 12, 1980

[54] APPARATUS USEFUL FOR LOADING AND SECURING A BOAT ONTO A VEHICLE

[76] Inventor: Don L. Kieffer, RFD 5, County Rd., Bedford, N.H. 03102

[21] Appl. No.: 3,017

[22] Filed: Jan. 12, 1979

[51] Int. Cl.² ............................................. B60R 9/00
[52] U.S. Cl. .................................. 224/310; 414/462
[58] Field of Search .............. 224/310, 325, 309, 329, 224/324, 322; 414/462; 280/179 R, 179 A; 296/3

[56] References Cited

U.S. PATENT DOCUMENTS

| D. 172,817 | 8/1954 | Binding | 224/322 |
|---|---|---|---|
| 2,663,473 | 12/1953 | McMillan | 224/310 |
| 2,834,491 | 5/1958 | Wells | 414/462 |
| 3,312,363 | 4/1967 | Oldham | 224/310 |
| 3,460,694 | 8/1969 | Simms | 414/462 |
| 3,528,578 | 9/1970 | Schoenberger | 414/462 |
| 3,843,001 | 10/1974 | Willis | 414/462 |
| 3,899,110 | 8/1975 | Binding et al. | 224/324 |
| 3,989,265 | 11/1976 | Smiley | 414/462 |
| 4,034,879 | 7/1977 | Cudmore | 414/462 |
| 4,084,735 | 4/1978 | Kappas | 224/329 |

*Primary Examiner*—Robert J. Spar
*Assistant Examiner*—Kenneth Noland

*Attorney, Agent, or Firm*—Gary D. Clapp

[57] ABSTRACT

Apparatus useful for loading and securing a boat onto a vehicle. Apparatus includes a mounting bolt attached to an end of the boat; mounting bolt having a shaft extending outwardly from the boat and an enlarged head at the outer end of the shaft. A horizontal, tubular bracket is mounted at one end of the vehicle; the bracket has a longitudinal opening extending therethrough, and a longitudinal slot in an upper wall. Mounting bolt engages the bracket with the bolt head within the longitudinal opening. A catch selectively retains the mounting bolt within a midportion of the bracket, or allows the bolt to pass longitudinally along the bracket to an end thereof to engage or disengage the bracket. In further embodiments, the slot is widened adjacent the bracket ends, to allow the mounting bolt head to pass vertically through the slot to engage and disengage the bracket, and stops prevent the mounting bolt from passing longitudinally out of the openings in the bracket ends. In yet other embodiments, the bracket ends are curved upwardly and formed to aid in guiding and retaining the mounting bolt head, a second support is provided at the other end of the vehicle, and wheels are attached to the other end of the boat to aid in moving the boat along the ground.

10 Claims, 4 Drawing Figures

APPARATUS USEFUL FOR LOADING AND SECURING A BOAT ONTO A VEHICLE

BACKGROUND OF THE INVENTION

1. Field of the Invention

This invention relates to transporting of boats on vehicles and, more particularly, to apparatus for loading and securing a boat onto a vehicle.

2. Description of Prior Art

There is a frequent requirement, for example by fishermen or vacationers, to transport boats by motor vehicle, e.g., from a home to a lake or river. Many of these boats are of a size and type to be carried on the roof of a automobile, truck, or camper. Roof racks for this purpose generally comprise a simple, horizontal bar attached to the forward portion of the roof, and a similiar bar attached to the rear portion of the roof. The boat is usually secured to the bars by, e.g., ropes, elastic cords and hooks, or adjustable straps and hooks.

A recurring problem of the prior art is that of adequately securing the boat to the vehicle. The boat should not break free of the vehicle in ordinary travel, nor in case of, e.g., sudden stops or turns, or in case of accident. Further, the means for securing the boat should be simple to use and manufacture. A second problem is that of loading and unloading the boat onto and from the vehicle. It is often necessary to a single person to handle the boat and the means for loading and unloading the boat should enable a single person to do so easily and safely.

The present invention provides an improved apparatus for load and securing a boat onto a vehicle, and provides a solution for the aforementioned problems of the prior art as will be discussed in detail herein below.

SUMMARY OF THE INVENTION

The present invention relates to apparatus useful for loading and securing a boat to a vehicle. The apparatus includes a mounting bolt attached to the boat; the mounting bolt having a shaft extending outwardly from an end of the boat and an enlarged head at the outer end of the shaft. A horizontal, tubular bracket is mounted at one end of the roof of the vehicle; the bracket has a longitudinal opening extending therethrough, and a longitudinal slot in an upper wall. The mounting bolt engages the bracket with the mounting bolt head within the longitudinal opening. A catch selectively retains the mounting bolt head within a midportion of the bracket, or allows the mounting bolt to pass longitudinally along the bracket to an end thereof to engage to or disengage from the bracket. In further embodiments, the slot is widened adjacent the ends of the bracket, to allow the mounting bolt head to pass vertically through the slot to engage and disengage the bracket, and stops prevent the mounting bolt head from passing longitudinally out of the openings in the ends of the bracket. In yet other embodiments, the ends of the bracket are curved upwardly and formed to aid in guiding and retaining the mounting bolt head, a second support is provided at the other end of the vehicle, and wheels are attached to the other end of the boat to aid in moving the boat along the ground.

It is thus advantageous to use the present invention for load and securing a boat to a vehicle because the boat is more securely attached to the vehicle. The present invention is further advantageous because it enables a single person to easily and safely load and unload the boat from the vehicle. Additionally, the apparatus of the present invention is easy to use and inexpensive to manufacture.

It is thus an object of the present invention to provide improved apparatus for transporting boats on vehicles.

It is another object of the present invention to provide inproved apparatus for securing a boat atop a vehicle.

It is yet another object of the present invention to provide improved apparatus for loading and unloading a boat from a vehicle.

It is a further object of the present invention to provide apparatus enabling a single person to easily and safely load and unload a boat from a vehicle.

Other objects and advantages of the present invention will be understood by those of ordinary skill in the art, after referring to detailed descriptions of preferred embodiments and drawings wherein:

DESCRIPTION OF THE PREFERRED EMBODIMENT

Figure 1:
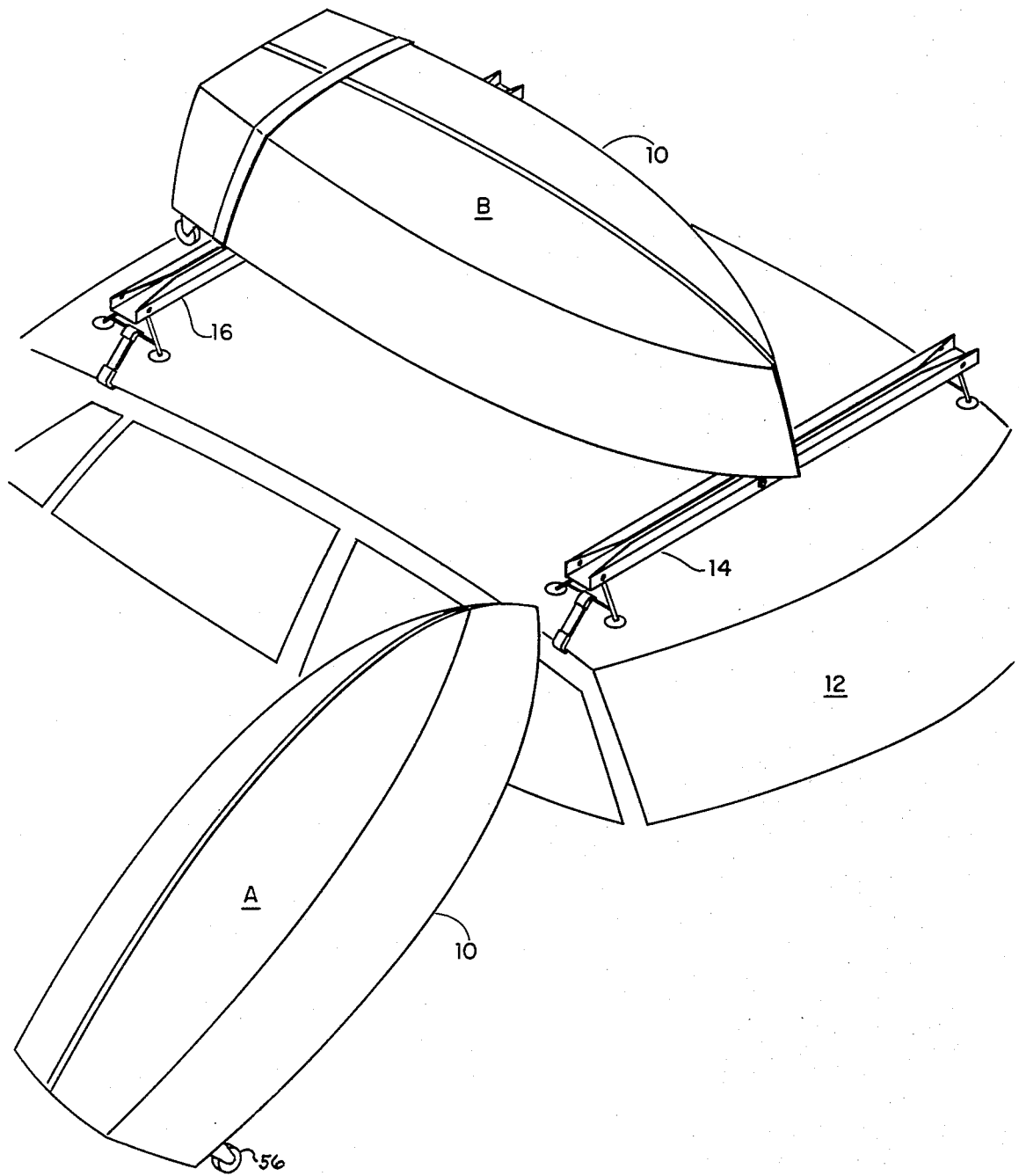
FIG. 1 is an isometric view of the present invention, showing a boat at start of loading onto a vehicle, and loaded onto a vehicle.

Referring to FIG. 1, an isometric view of the present invention is shown. Boat 10 (e.g., an 8 feet aluminum boat) is depicted in position A, at start of being loaded onto vehicle 12, and in position B, secured on vehicle 12 roof. Bracket 14 is located at forward roof portion of vehicle 12 and is oriented in a horizontal position perpendicular to vehicle 12 longitudinal axis. Support 16 is located at rearward roof portion of vehicle 12 and oriented similiarly to bracket 14.

Figure 2:
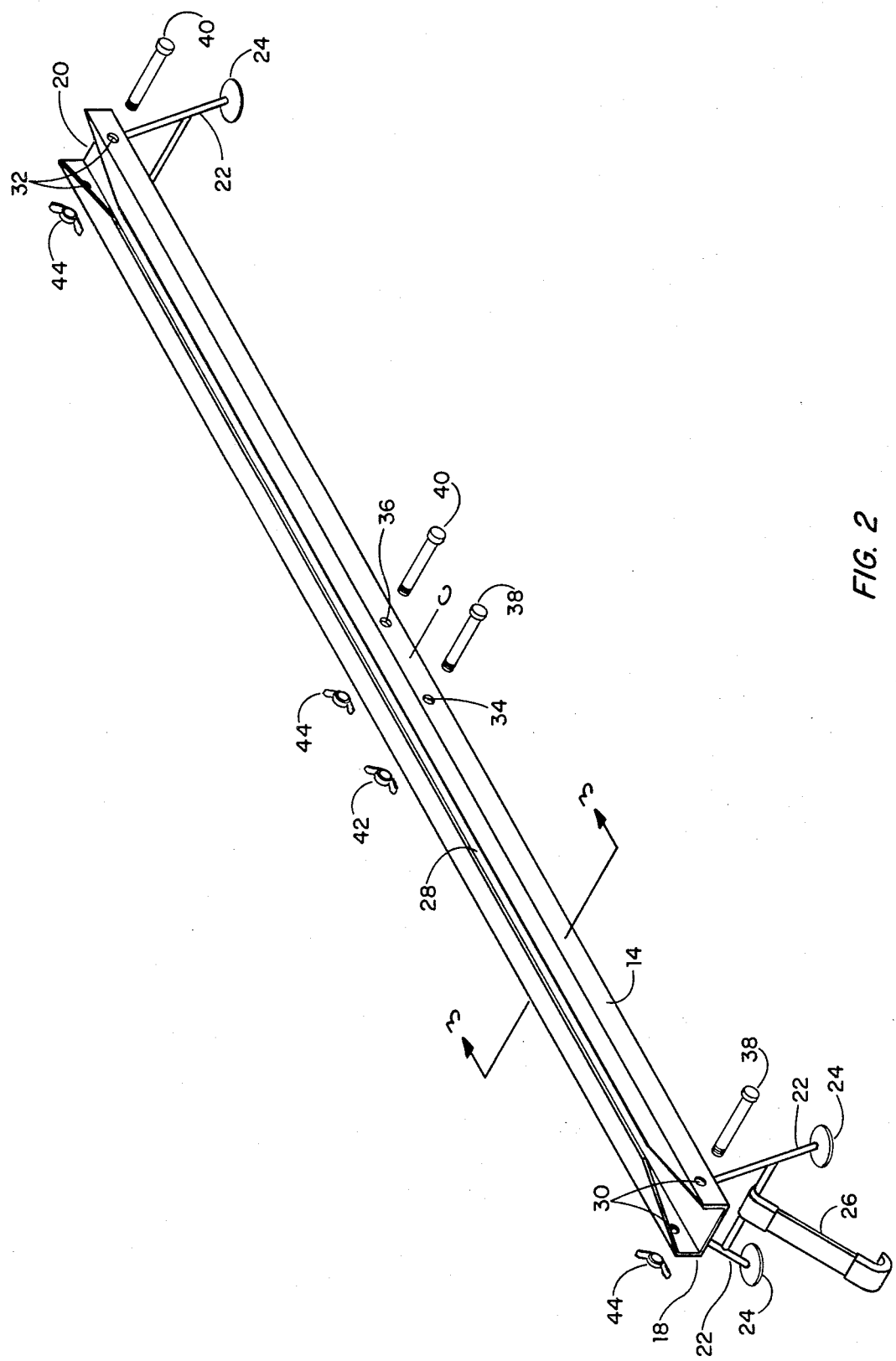
FIG. 2 is a detailed, isometric view of the bracket.

Referring to FIG. 2, an isometric view of bracket 14 is shown. Bracket 14 is supported at ends 18 and 20 by arms 22, which have suction cups 24 bearing against vehicle 12 roof at their lower ends. Bracket 14 is secured to vehicle 12 roof by adjustable strap and hook fasteners 26, which hook under vehicle 12 roof edge and exert a downwards force against ends 18 and 20. Support 16 is similiarly supported and secured to vehicle 12 roof.

Bracket 14 is a rectangular steel tube having a rectangular opening extending therethrough from end 18 to end 20. In present embodiment, bracket 14 is 54 inches long (to fit, e.g., a compact car), 2½ inches wide, and 1 inch high. Bracket 14 walls are 1/16 inch thick. Slot 28 extends from end 18 to end 20 and is ⅜ inch wide, except in 4 inch portions of slot 28 adjacent ends 18 and 20. At ends 18 and 20, the width of slot 28 is approximately equal to the inner width of bracket 14 (i.e., 2 inches). Slot 28 decreases linearly to the width of ⅜ inches over the 4 inch portions of bracket 14 extending inwardly from ends 18 and 20. Bracket 14 has 7/16 inch holes 30 and 32 located ½ inch from ends 18 and 20, and 7/16 inch holes 34 and 36 located 9/16 inch to either side of midpoint C. Retaining bolts 38 and 40 are 2½ inches long and 5/16 inch diameter. Bolt 38 is inserted through either holes 30 or holes 34 and extends through bracket 14; bolt 38 is retained therein by wing nut 42. Bolt 40 is similiarly inserted through either holes 32 or holes 36, and retained therein by wing nut 44.

Figure 3:
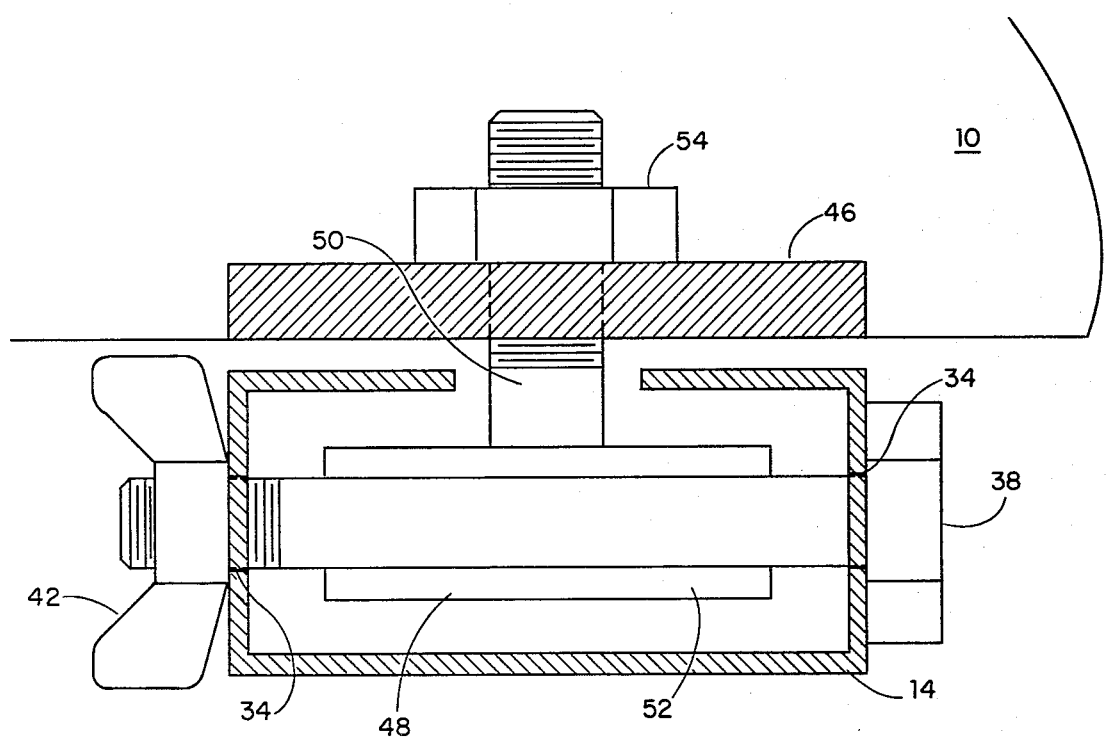
FIG. 3 is a cross-section of the bracket, and a partly broken away view of the boat attached to the bracket.

Referring to FIG. 3, a cross section view of bracket 14 along 3—3 is shown. Also shown therein is a partly broken away view of boat 10 bow; boat 10 is depicted as being secured upside down on vehicle 12 roof by bracket 14. Retaining bolt 38 is shown as inserted through holes 34 and retained therein by wing nut 42 to, as discussed below, secure boat 10 to bracket 14.

Mounting plate 46 is attached to boat 10 bow and may be a part of boat 10 (e.g., a thwart) or a separate plate welded or bolted to boat 10. Mounting bolt 48 extends outwardly from plate 46 and comprises shaft portion 50 and head portion 52. Mounting bolt 48 may be attached to plate 46 as shown, by a threaded portion of reduced diameter extending through a hole in plate 46 and retained therein by nut 54, or, e.g., be welded to plate 46. The diameter of shaft portion 50 of mounting bolt 48 is less than the width of slot 28, e.g., 5/16 inch to ⅜ inch, to allow shaft portion 50 to pass easily along slot 28 with head portion 52 within bracket 14. Length of shaft portion 50 is selected so that, as shown, head portion 52 is approximately centered in height within bracket 14 when the upper edge of boat 10 (shown in FIG. 3 as facing downwardly) is resting on bracket 14. Head portion 52 diameter is greater than width of slot 28, so that head portion 52 cannot pass through slot 28, and less than the inner width of bracket 14, to easily pass longitudinally along bracket 14 within the opening therethrough (e.g., between ¾ inch and 1½ inches in diameter). Height of head portion 52 is less than inner height of the opening through bracket 14 to allow easy passage therethrough (e.g., ¾ inch). Head portion 52 height is sufficient to prevent head portion 52 from passing between the top surface of retaining bolts 38 or 40 and the lower surface of the upper wall of bracket 14 (e.g., between ⅜ and ¾ inch height).

The apparatus of the present invention is assembled for use by securing bracket 14 and support 16 to, respectively, forward and rearward portions of vehicle 12 roof by means of adjustable strap and hook fasteners 26. Retaining bolts 38 and 40 are inserted into, respectively, holes 34 and holes 36 and retained therein by wing nuts 42 and 44. Mounting bolt 48 is attached to the upper portion of boat 10 bow by mounting plate 46. Referring to FIG. 1, wheels 56 may be attached to each side of the stern portion of boat 10 to extend upwardly therefrom. Wheels 56 may be permanently or detachably mounted on boat 10 and, preferably, may each rotate independently about a vertical axis.

In use, assuming boat 10 is to be loaded from the right side of vehicle 12 as shown in FIG. 1, retaining bolt 38 is remov from holes 34. Bolt 38 is then inserted through holes 30 and retained therein by wing nut 42. Boat 10 is turned upside down, to rest on wheels 56 while the operator supports boat 10 bow. The operator then pulls boat 10 to the right side of vehicle 12 and raises the bow of boat 10 until head portion 52 of mounting bolt 48 is above end 18 of bracket 14. Operator then lowers boat 10 bow so that head portion 52 passes through the widened portion of slot 28 and within bracket 14 inside of retaining bolt 38. Bolt 38 then acts as a catch to prevent mounting bolt 48 from sliding out of bracket 14; boat 10 is thereby prevented from accidentally falling to the ground. Alternately, head portion 52 could be inserted longitudinally into bracket 14 through end 18 and bolt 38 inserted into holes 30 afterwards; this method is less secure than the preferred method, but is somewhat faster.

Operator then lifts the stern of boat 10, to approximately the level of bracket 14, and exerts force along the axis of boat 10 so that mounting bolt 48 and the bow of boat 10 slide along bracket 14. Mounting bolt 48 will be stopped from further movement at about midpoint C of bracket 14 by bolt 40, which acts as a stop. Operator then pivots boat 10 about mounting bolt 48, while continuing to exert force along boat 10 axis towards mounting bolt 48, lifts boat 10 stern onto support 16, and centers the stern on support 16. Operator then removes retaining bolt 38 from holes 30, inserts bolt 38 into holes 34, and retains bolt 38 therein with wing nut 42. Boat 10 bow is then securely attached, through mounting bolt 48, to bracket 14 between bolt 38 and bolt 40. Head portion 52 of mounting bolt 48, and thus the bow of boat 10, is restrained from vertical or longitudinal motion relative to vehicle 12 by the walls of bracket 14. Bolts 38 and 40 act as catches to retain head portion 52 in the midportion of bracket 14 (between holes 34 and holes 36), thus preventing sidewise motion of boat 10 bow. Boat 10 stern is then secured to support 16 by, e.g., ropes, elastic cords and hooks, or adjustable straps and hooks.

Boat 10 may also be loaded onto and secured to vehicle 12 from the left side. In this case, the roles of bolts 38 and 40 are reversed, and mounting bolt 48 is inserted into bracket 14 at end 20.

Boat 10 is unloaded from vehicle 12 by reversing the steps recited above. E.g., freeing boat 10 stern from support 12 and moving bolt 38 from holes 34 to holes 30. Boat 10 stern is then lifted and boat 10 pivoted about mounting bolt 48 until boat 10 extends to the right of vehicle 12. The operator then pulls on boat 10 stern so that mounting bolt 48 slides along bracket 14 until stopped by bolt 38. Boat 10 stern is then lowered to the ground, and boat 10 bow raised to free mounting bolt 48 from bracket 14.

Figure 4:
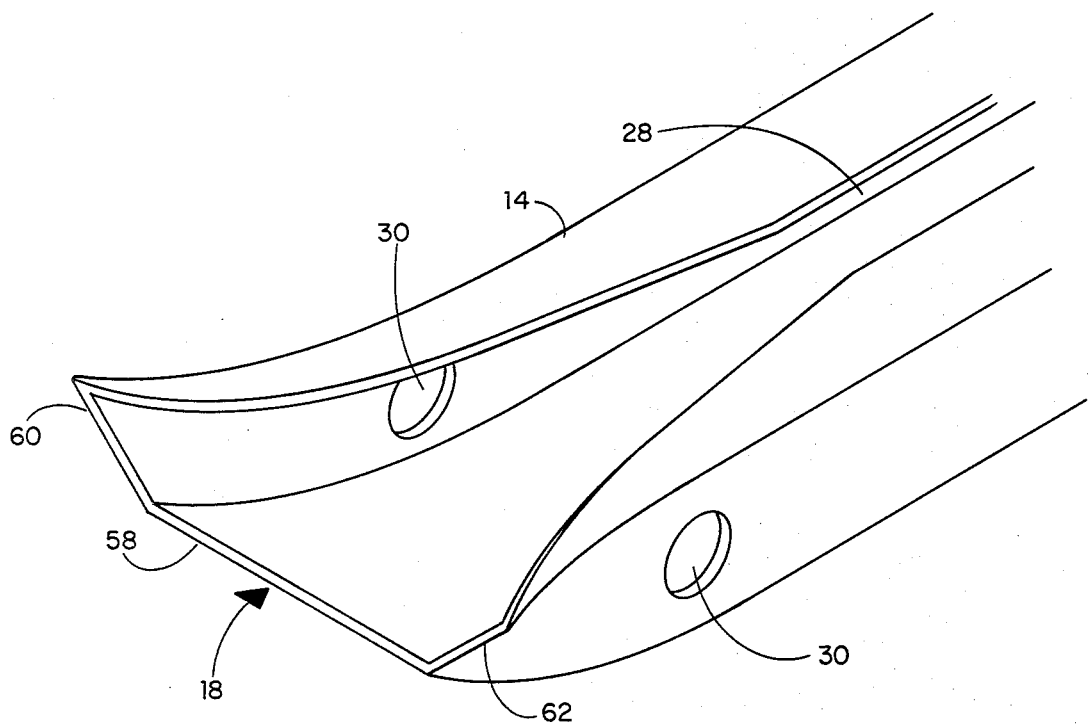
FIG. 4 shows a further embodiment of the bracket.

Referring to FIG. 4, a further embodiment of ends 18 and 20 are shown. In this embodiment, bottom wall 58 of bracket 14 is curved upwardly at ends 18 and 20, and side walls 60 and 62 are curved outwardly. Ends 18 and 20 of bracket 14 thereby form guides for receiving mounting bolt 48, thus aiding the operator in inserting mounting bolt 48 into bracket 14 and assisting in preventing mounting bolt 48 from accidentally sliding out of bracket 14. Bottom wall 58 may be turned upwards, e.g., nearly vertically, so that bolt 38 and holes 30 are not required to retain mounting bolt 48 in bracket 14.

Description of the preferred embodiment of the present invention is hereby concluded. The invention may be embodied in yet other specific forms without departing from the spirit or essential characteristics thereof. E.g., the apparatus may be constructed with dimensions other than those stated herein, for other types and sizes of boat and vehicle (e.g., canoes and campers). Similiarly, bracket 14 and other parts described may be made, e.g., of fiberglass or aluminum, rather than steel. Bracket 14 may have a circular cross-section. Holes 30 and 32, and bolts 38 and 40 inserted therein, may be replaced by portions of bracket 14 walls extending across the opening at ends 18 and 20. Similiarly, holes 34 and holes 36, and bolts 38 and 40 inserted therein, may be replaced by, e.g., spring loaded catches. Holes 30, 32, 34, and 36 may be key shaped, and bolts 38 and 40 correspondingly shaped to be inserted therein and locked therein by being rotated. The shape of mounting bolt 48 may differ from that described herein. The positions of brackets 14 and support 16 may be reversed. The positions of mounting bolt 48 and wheels 56 on boat 10 may also be reversed. Thus, the present embodiments are to be considered in all respects as illustrative and not as restrictive, the scope of the invention being indicated by the appended claims rather than by the foregoing description, and all changes which come within the meaning and range of equivalency of the claims are therefore intended to be embraced therein.

What is claimed is:

1. Apparatus useful for loading and securing a boat onto a vehicle, comprising:
    a single mounting means mounted at a first end of said boat, said single mounting means including a shaft portion extending outwardly from said boat and a head portion attached to an outer end of said shaft portion, the diameter of said head portion being greater than the diameter of said shaft portion; and
    a single elongated tubular bracket horizontally mounted on an upper surface of said vehicle and extending perpendicularly to a longitudinal axis of said vehicle, said bracket having
    an opening extending therethrough from a first end to a second end of said single bracket, for receiving and passing said head portion therethrough, and
    a longitudinal slot in an upper wall of said single bracket, said slot extending from said first bracket end to at least a midpoint of said single bracket and having a width greater than said diameter of said shaft portion and less than said diameter of said head portion, for receiving and passing said shaft portion therethrough, and said bracket including
    catch means located at a midportion of said single bracket, for selectively (1) retaining said single mounting means within said midportion of said single bracket, and (2) allowing said single mounting means to pass longitudinally along said single bracket between said midportion and at least said first bracket end,
    said single mounting means engaging said single bracket with said head portion within said opening and said shaft portion extending through said slot so that said single mounting means and said single bracket support said first end of said boat and restrain said first end of said boat to allow movement of said first end of said boat only along said single bracket while loading and unloading said boat while allowing said boat to pivot around said single mounting means, and
    said catch means capturing said single mounting means within said midportion of said single bracket to secure said boat to said vehicle.

2. The apparatus of claim 1, wherein
    said slot extends from said first bracket end to said second bracket end, and
    said catch means further includes means for selectively (3) allowing said mounting means to pass longitudinally along said bracket between said midportion and said second bracket end.

3. The apparatus of claim 2, wherein
    first and second end portions of said slot, respectively adjacent said first and second bracket ends, have a width greater than said diameter of said head portion, for allowing passage of said portion through said slot in a vertical direction adjacent said first and second bracket ends.

4. The apparatus of claim 3, said single bracket further including first and second stop means, respectively located at said first and second bracket ends, for selectively preventing longitudinal passage of said single mounting means through said slot and said openings at said first and second bracket ends, said first and second stop means capturing said single mounting means within said single bracket, until released, to prevent unintentional disengagement of said single mounting means and said single bracket during said loading and unloading of said boat.

5. The apparatus of claim 4, wherein said catch means comprises:
    first catch means spaced apart from a midpoint of said bracket towards said first bracket end, for selectively allowing said mounting means to pass longitudinally along said bracket between said midportion and said first bracket end; and
    second catch means spaced apart from a midpoint of said bracket towards said second bracket end, for selectively allowing said mounting means to pass longitudinally along said bracket between said portion and said second bracket end,
    said midportion of said bracket being a portion of said bracket located between said first and second catch means.

6. The apparatus of claim 5, further comprising: support means longitudinally spaced apart from said bracket along said longitudinal axis of said vehicle for supporting a second end of said boat, said support means comprising a horizontally mounted, elongated member extending perpendicularly to said longitudinal axis of said vehicle.

7. The apparatus of claim 5, further comprising: wheel means located at a second end of said boat and entending outwardly from said boat in the same direction as said mounting means, for supporting said second end of said boat in movement across ground.

8. The apparatus of claim 5, wherein the bottom wall of said single bracket is curved upwardly at said first and second bracket ends, and the side walls of said bracket are curved outwardly at said first and second bracket ends, for receiving and guiding said single mounting means in engaging and disengaging said single bracket.

9. The apparatus of claim 5, wherein
    said bracket has first and second holes respectively extending transversely through said bracket adjacent said first and second bracket ends, and
    third and fourth holes respectively spaced apart from said midpoint towards said first and second bracket ends and extending transversely through said bracket; and said bracket further includes
    first bolt means selectively insertable in said first and third holes to respectively comprise said first stop means and said first catch means, and
    second bolt means selectively insertable in said second and fourth holes to respectively comprise said second stop means and said second catch means.

10. The apparatus of claim 5 wherein said elongated, tubular bracket has a rectangular cross-section.

* * * * *